Sept. 6, 1932.  E. P. HURD  1,875,734
SPARE TIRE AND RIM LOCK
Filed April 2, 1928  2 Sheets-Sheet 1
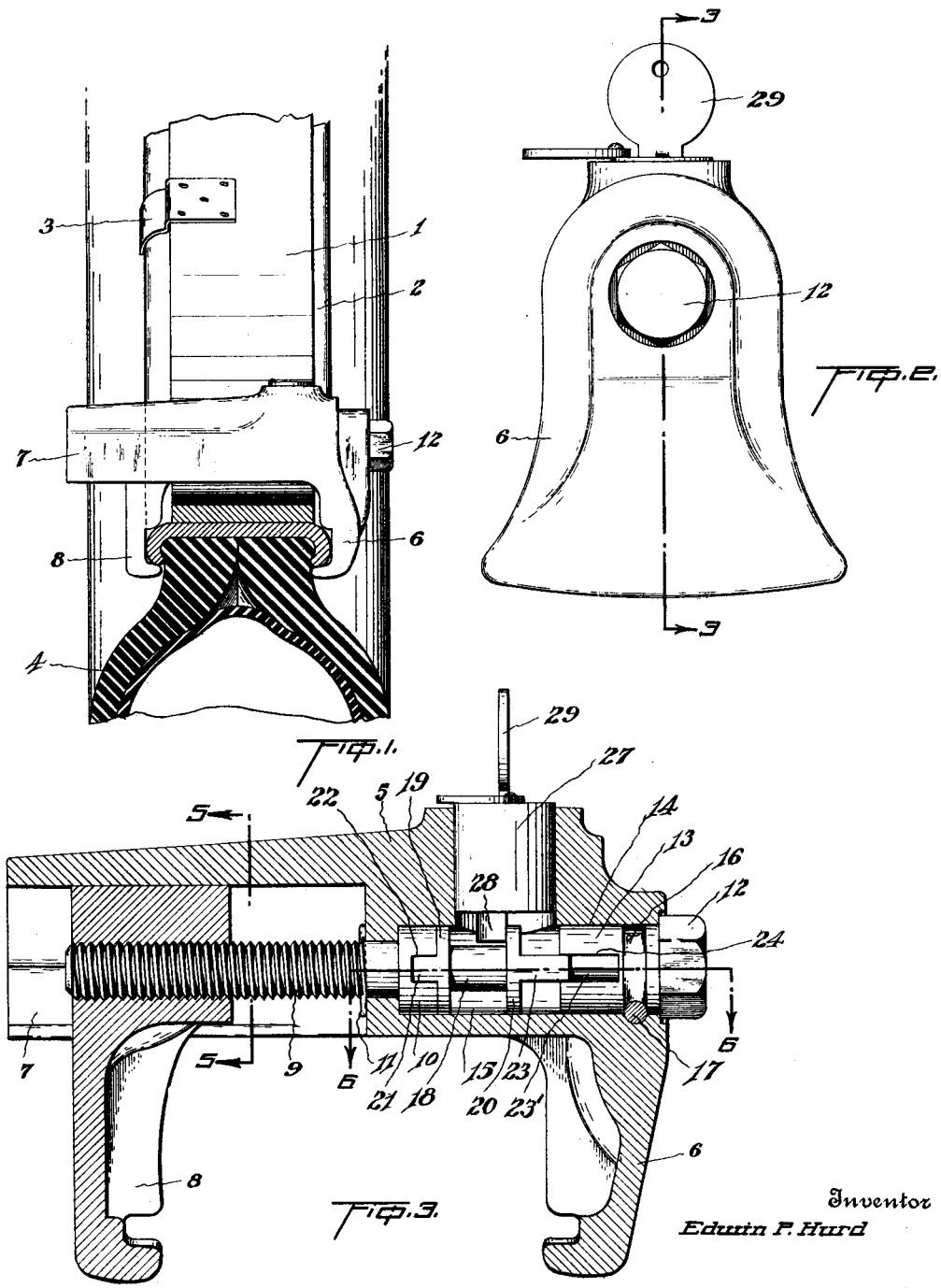
Inventor
Edwin P. Hurd
By
Attorney Sept. 6, 1932.   E. P. HURD   1,875,734
SPARE TIRE AND RIM LOCK
Filed April 2, 1928   2 Sheets-Sheet 2
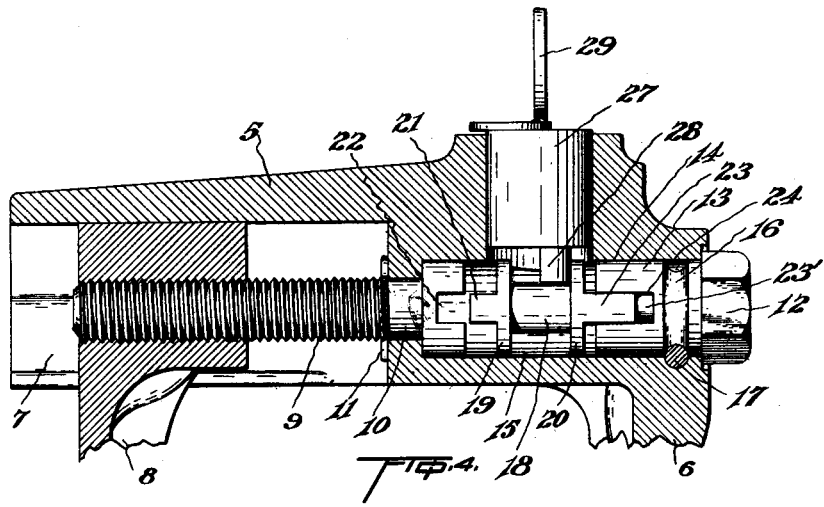
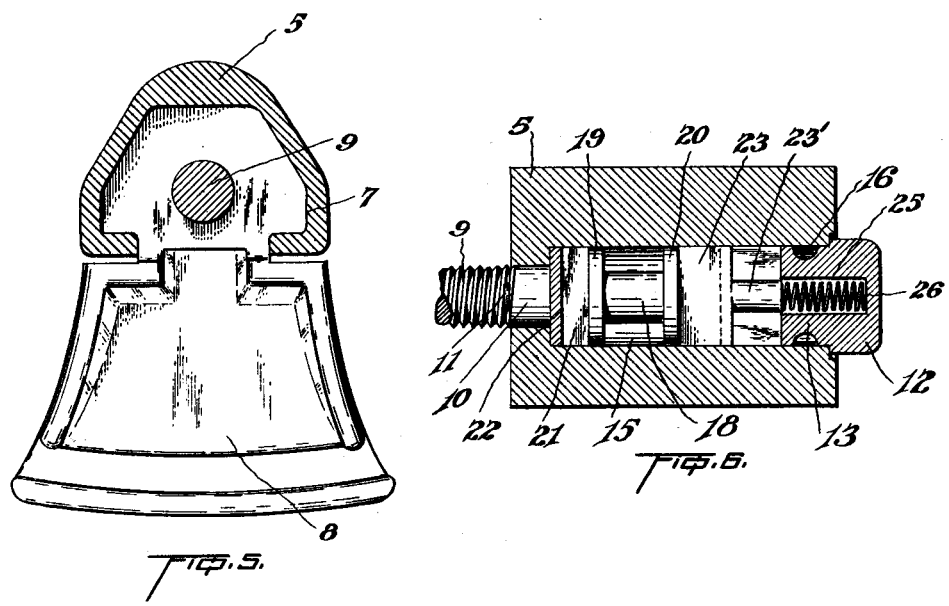
Inventor
Edwin P. Hurd Patented Sept. 6, 1932

1,875,734

UNITED STATES PATENT OFFICE

EDWIN P. HURD, OF DETROIT, MICHIGAN

SPARE TIRE AND RIM LOCK

Application filed April 2, 1928. Serial No. 266,478.

The present invention pertains to a novel lock for securing the spare tire and rim of a motor vehicle against unauthorized removal and theft. Although the invention is directed principally to the provision of a device of this character, certain of the constructions thereof may be utilized in various contrivances where it is desired to have a lock-controlled coupling between an adjusting member and an operating member. In the present instance there is provided a body having a fixed jaw formed as a part thereof and a slidable jaw mounted therein. These two jaws are adapted to be clamped over the clincher sides of the spare rim and locked in this position so that the rim and tire held thereby cannot be removed. The movable jaw is adjusted by means of a screw threaded therethrough, the head of the screw being concealed and inaccessible. The screw is turned upon an exterior or exposed operating element in the form of a nut, and a suitable slidable coupling member is provided between the nut and the screw to transmit rotation from one to the other. The coupling member is of such construction that it may be entirely freed from the screw, and when in this position, does not operate on the screw and movable jaw, although the operating member may be turned. The coupling member is moved to its inoperative position by a lock-controlled cam and cannot be returned to operative position without the use of the proper key for the lock. Thus, when the jaws are adjusted on the rim in the position described and the coupling member released, it is impossible to spread the jaws unless the proper key is used for permitting the coupling to return to operative position.

The invention is fully disclosed by way of example in the following description and in the accompanying drawings, in which—

Figure 1 is a transverse section of a spare tire carrier, rim and tire, showing the lock in elevation;

Fig. 2 is an end view of the lock;

Fig. 3 is a longitudinal section thereof on the line 3—3 of Figure 2, showing the coupling in operative position;

Fig. 4 is a similar section showing the coupling in inoperative position;

Fig. 5 is a transverse section on the line 5—5 of Figure 3; and

Fig. 6 is a detail longitudinal section on the line 6—6 of Figure 3.

Reference to these views will now be made by use of like characters which are employed to designate corresponding parts throughout.

In Figure 1 is illustrated in a simple manner a band or spare tire carrier 1 which may be fixed on the rear end or other part of a motor vehicle in any conventional or desired manner. The band is surrounded by a clincher rim 2 which is held for example by clips 3. Finally, the rim carries a tire 4 applied thereto in the usual manner.

The device constituting the present invention includes a body 5 having a fixed jaw 6 formed integral therewith. The body is somewhat elongated and has a channeled portion 7 in which is slidably mounted a movable jaw 8 disposed opposite the jaw 6. The two jaws are adapted to clamp against the rim 2, and if the body 5 is placed within the band 1, it will be obvious that the rim 2 cannot be removed from the band and the tire cannot be removed from the rim when the jaws are locked or fixed in the position shown in Figure 1.

For the purpose of adjusting the movable jaw, there is provided a screw 9 threaded therethrough and having a head 10 rotatably mounted in the body. A cotter pin 11 passed through the shank and engaging the end wall of the channel 7 prevents the screw from sliding. In the body is also mounted an operating element in the form of a nut 12 which is exposed and therefore engageable by a wrench or other suitable tool. The nut has a stud or shank 13 extending into the body in axial alignment with the screw 9 but spaced from the head 10. The bored recess 14 which receives the member 13 is extended as at 15 a sufficient distance to receive the head 10. The shank 13 has a peripheral groove 16 receiving a pin 17 embedded in the jaw 6, so that the movement of the operating element is limited to rotation.

Between the members 10 and 13 is disposed a slidable coupling member in the form of a pin or stud 18 formed at its ends with disks 19 and 20 of such size as to fit slidably in the recess 15. The disk 19 is formed with a tongue 21 receivable in a correspondingly shaped slot 22 cut in the head 10. In like manner the disk 20 has a tongue 23 receivable in a slot 24 formed in the stud 13. It will be seen that the tongue 23 and slot 24 are longer than the tongue 21 and slot 22 so that the latter tongue may be entirely withdrawn from its slot in order to disconnect the operating member 12 from the adjusting member 9 as shown in Figure 4.

The nut 12 has an axial bore 25 containing a compressed spring 26 which bears against a stem 23′ on the tongue 23 and normally urges the coupling member to connect with the head 10. Assuming that the parts are in such position, as shown in Figure 3, the jaws may be clamped in the position shown in Figure 1 by turning the member 12. In order that this adjustment may be rendered immune from unauthorized interference, it is necessary that the coupling be broken. This operation is accomplished by a cylinder lock 27 mounted in the body adjacent the coupling member and having its rotatable barrel (not shown) formed with a semi-cylindrical cam 28 engageable with the disk 20. When the diameter or flat side of the cam engages the disk, the coupling is operative, but when the cam is turned by use of the proper key 29, it slides the coupling member away from the head 10 and thus separates it completely from the adjusting screw 9. After the key has been withdrawn, it is impossible to make the coupling until the proper key is used again to return the parts to the position shown in Figure 3. With the coupling detached from the adjusting member, as in Figure 4, and the head 10 of the latter concealed, access to the adjusting member for the purpose of releasing the grip on the rim 2 is completely obstructed.

Although a specific embodiment of the invention has been illustrated and described, it will be understood that various alterations in the details of construction may be made without departing from the scope of the invention as indicated by the appended claims.

What I claim is:

1. In an expanding and contracting device, a rotatable adjusting element, an operating element spaced therefrom, a coupling member adapted to connect said elements, and a lock-controlled device adapted to actuate said member for connecting or disconnecting said elements.

2. In an expanding and contracting device, a rotatable adjusting element, an operating element spaced therefrom, said elements being slotted in their confronting ends a coupling member slidable between said elements and having tongues adapted for reception in the slots for connecting said elements, and a lock-controlled cam adapted to act on said member for connecting or disconnecting said elements.

3. In an expanding and contracting device, a rotatable adjusting element, an operating element spaced therefrom, said elements being slotted in their confronting ends, a coupling member slidable between said elements and having tongues adapted for reception in the slots for connecting said elements, one of said tongues and the corresponding slot being longer than the other tongue and slot to permit the coupling member to free itself from the last named slot, and a lock-controlled cam adapted to act on said member for connecting or disconnecting said elements.

4. In an expanding and contracting device, a rotatable adjusting element, an operating element spaced therefrom, a coupling member adapted to connect said elements, a lock-controlled device adapted to actuate said member for connecting or disconnecting said elements, and a spring in one of said elements and acting on said coupling member to move it normally into coupling position.

5. In an expanding and contracting device, a rotatable adjusting elment, an operating element spaced therefrom, said elements being slotted in their confronting ends, a coupling member slidable between said elements and having tongues adapted for reception in the slots for connecting said elements, one of said tongues and the corresponding slot being longer than the other tongue and slot to permit the coupling member to free itself from the last named slot, a lock-controlled cam adapted to act on said member for connecting or disconnecting said elements, and a spring in one of said elements and acting on said coupling member to move it normally into coupling position.

6. A lock comprising a fixed jaw and movable jaw, a screw rotatably supported in one of said jaws and threaded through the other jaw, an operating element rotatably mounted in the fixed jaw, a coupling member slidably mounted between said screw and operating element, and a lock-controlled cam adapted to actuate said member for connecting or disconnecting said screw and operating member.

7. A lock comprising a fixed jaw and movable jaw, a screw rotatably supported in one of said jaws and threaded through the other jaw, an operating element rotatably mounted in the fixed jaw, a coupling member slidably mounted between said screw and operating element, a lock-controlled cam adapted to actuate said member for connecting or disconnecting said screw and operating member, and a spring mounted in said operating member and acting on said coupling member to move it normally towards said screw.

8. In a locking device of the class described, a casing, a member mounted within the casing provided with a bolt extending through the casing, the projecting portion thereof having threads for receiving a member to be locked, a second member within the casing, and lock controlled means for directly connecting said second member with the first member to permit of rotation of the threaded member, and for disconnecting said members to permit said second member to rotate freely within the casing.

9. In a locking device of the class described, a pair of relatively movable lock members, a threaded bolt having the head thereof enclosed within one of the lock members and the threaded portion thereof operatively associated with the other lock member, a rotary member for effecting rotation of the bolt, and lock controlled means for connecting and disconnecting said rotary member with respect to the threaded bolt.

10. In a locking device of the class described, a pair of relatively movable lock members of sleeve-like construction, said members being secured against relative rotation, a threaded bolt having the head thereof enclosed within one of the sleeve-like members and the threaded portion thereof operatively associated with the other sleeve-like lock member, a rotary actuating member for effecting rotation of the bolt, and lock controlled means for connecting and disconnecting said actuating member from the threaded bolt.

11. A tire lock comprising a pair of bodies inter-engaging members for moving said bodies to and from locked position, and a key operable device for separating said members for rendering the same inoperable to effect the separation of said bodies.

12. A tire lock comprising a pair of bodies, tool operable inter-engaging members for moving said bodies to and from locked position, one of said members being slidable within one of said bodies, and a key operable device for sliding said slidable member out of engagement with another of said members for rendering the members inoperable to effect the separation of said bodies.

13. A tire lock comprising a pair of bodies, one of said bodies having a longitudinal bore therein, a rotatable tool operable member in said bore, a slidable sleeve rotatable with said member, a threaded bolt extending from said bore for engagement with said other body for securing said bodies together, said bolt and sleeve having inter-engaging portions whereby said bolt can be rotated with said tool operable member, and a key operable device for sliding said sleeve out of engagement with said bolt for rendering the latter inoperable by said member.

14. A tire lock comprising a pair of body members, a bolt in a recess in one of said members adapted to threadedly engage the other member for securing the two together, a tool operable spindle closing said recess and rendering the bolt inaccessible, a slidable sleeve in said recess adapted when in one position to effect an operating connection between said spindle and bolt, and a key operable lock for controlling said sleeve.

15. A tire lock comprising a body having a bore therein, a tool operable spindle rotatably secured therein, a sleeve in said bore slidably splined on said spindle, a bolt having a head in said bore and a threaded portion extending therefrom, a second body member having a threaded recess adapted to co-act with said bolt for securing said bodies together, said sleeve and bolt head having inter-engageable portions whereby said spindle and bolt can be operatively connected for rotating the latter when the spindle is rotated by a tool, said sleeve having an annular rib, and a key operable device provided with an eccentric engageable with said rib for sliding said sleeve out of engagement with said bolt for rendering the latter inoperable by said spindle.

In testimony whereof I affix my signature.
EDWIN P. HURD.